United States Patent

Suzuki et al.

[11] Patent Number: 5,924,412
[45] Date of Patent: Jul. 20, 1999

[54] EXHAUST GAS RECIRCULATION CONTROL DEVICE FOR ENGINE WITH DUAL COOLING SYSTEM

[75] Inventors: Makoto Suzuki, Mishima; Akio Matsunaga, Susono, both of Japan

[73] Assignee: Toyota Jidosha Kabushiki Kaisha, Aichi, Japan

[21] Appl. No.: 08/943,179

[22] Filed: Oct. 3, 1997

[30] Foreign Application Priority Data

Oct. 7, 1996 [JP] Japan ................................. 8-265831

[51] Int. Cl.⁶ .......................... F02M 25/07; F01P 7/14
[52] U.S. Cl. ........................... 123/568.21; 123/41.08
[58] Field of Search ........................ 123/41.02, 568.31, 123/568.11, 568.21, 568.22, 568.23, 568.24, 568.25, 568.26, 568.27, 568.28, 568.29, 568.3, 568.32, 41.08, 41.09

[56] References Cited

U.S. PATENT DOCUMENTS 4,423,705 1/1984 Morita et al. ........................ 123/41.02

FOREIGN PATENT DOCUMENTS

A-57-159916 10/1982 Japan .

Primary Examiner—Andrew M. Dollnar
Assistant Examiner—Arnold Castro
Attorney, Agent, or Firm—Oliff & Berridge, PLC

[57] ABSTRACT

An engine is provided with a dual cooling system having a head-side cooling water passage formed in a cylinder head, through which a cooling water can be circulated, and a block-side cooling water passage formed in a cylinder block, through which a cooling water can be circulated, in which a block-side circulation can be stopped without stopping a head-side circulation. An exhaust gas recirculation control device for such engine comprises a temperature sensor for detecting a temperature of the cooling water circulating the head-side passage (THW); and an exhaust gas recirculation (EGR) system for supplying an EGR gas to the engine. The EGR system performs the supply of the EGR gas when the cooling water temperature (THW) is higher than a predetermined temperature (THE), and stops the supply of the EGR gas when the cooling water temperature (THW) is lower than the predetermined temperature (THE). The predetermined temperature when the block-side circulation is stopped (THL) is set to be different from the predetermined temperature when the block-side circulation is performed (THH).

10 Claims, 5 Drawing Sheets

EXHAUST GAS RECIRCULATION CONTROL DEVICE FOR ENGINE WITH DUAL COOLING SYSTEM

BACKGROUND OF THE INVENTION

1. Field of the Invention

The present invention relates to an exhaust gas recirculation control device for an engine with a dual cooling system.

2. Description of the Related Art

An exhaust gas recirculation (EGR) control device for an engine, in which a part of an exhaust gas of the engine, as an EGR gas, is recirculated to the engine to improve the exhaust emission, is well known. However, if the supply of the EGR gas is performed when the temperature of the cylinder wall is low, the sulfur fraction in the EGR gas may reach the cylinder wall at the low temperature and be converted to sulfuric acid, and thereby the cylinder wall or the piston ring may be corroded by such sulfuric acid.

To solve this problem, an EGR control device in which the supply of the EGR gas is stopped when the cooling water temperature is lower than a predetermined temperature is also well known, and control is performed when the temperature of the cooling water of the engine is higher than the predetermined temperature.

On the other hand, Japanese Unexamined Patent Publication No. 57-159916 discloses a dual cooling system for an engine, in which the cooling system is provided with a head-side cooling passage formed in the cylinder head, and a block-side cooling passage formed in the cylinder block, and in which the cooling water circulation through the block-side passage can be stopped without stopping the cooling water circulation through the head-side passage. In the cooling system, when the engine is, for example, warming-up, the cooling water circulation through the block-side passage is stopped while the cooling water circulation through the head-side passage is performed, to thereby ensure good cooling of the cylinder head and increase the temperature of the cylinder block, i.e., the cylinder bore wall, rapidly to thereby shorten the time required for warming-up.

On the other hand, the above-mentioned EGR control device may be applied to such an engine with the dual cooling system to stop the supply of the EGR gas when, for example, the temperature of the cooling water circulating through the head-side passage is lower than a predetermined temperature, and to perform the supply of the EGR gas when the temperature of the cooling water is higher than the predetermined temperature. In this case, the predetermined temperature may be set to a temperature of the cooling water above which the supply of the EGR gas is performable with cooling water circulation through both of the head-side and block-side passages being performed. However, in the case where the temperature of, for example, the cooling water circulating through the head-side passage rises, if the cooling water circulation through the block-side passage is stopped while the cooling water circulation through the head-side passage is performed, the temperature of the cooling water circulating through the head-side passage is still lower than the predetermined temperature, even after the temperature of the cylinder bore wall becomes higher than a temperature above which the supply of the EGR gas is performable. Thus, the supply of the EGR gas is not performed during a period from when the temperature of the cylinder bore wall reaches the temperature above which the supply of the EGR gas is performable until the cooling water temperature is higher than the predetermined temperature, and therefore a problem arises that the improvement of the exhaust emission by the EGR gas is not ensured during this period.

Also, in the case where the temperature of the cooling water circulating through the head-side passage drops, if the cooling water circulation through the block-side passage is stopped while the cooling water circulation through the head-side passage is performed, the temperature of the cooling water circulating through the head-side passage becomes lower than the predetermined temperature, even though the temperature of the cylinder bore wall is still higher than the temperature above which the supply of the EGR gas is performable. Thus, also in this case, the improvement of the exhaust emission by the EGR gas is not ensured.

SUMMARY OF THE INVENTION

An object of the present invention is to provide an exhaust gas recirculation control device for an engine with a dual cooling system capable of suitably controlling the supply of the EGR gas regardless of the operation of the cooling water circulation, to thereby ensure the good improvement of the exhaust emission by the EGR gas.

According to the present invention, there is provided an exhaust gas recirculation control device for an engine with a dual cooling system, the dual cooling system having a head-side cooling water passage formed in a cylinder head, through which a cooling water can be circulated, and a block-side cooling water passage formed in a cylinder block, through which a cooling water can be circulated, in which a block-side circulation can be stopped without stopping a head-side circulation, the device comprising: a temperature sensor for detecting a temperature of the cooling water circulating the head-side passage (THW); and an exhaust gas recirculation (EGR) system for supplying an EGR gas to the engine, the EGR system performing the supply of the EGR gas when the cooling water temperature (THW) is higher than a predetermined temperature (THE), and stopping the supply of the EGR gas when the cooling water temperature (THW) is lower than the predetermined temperature (THE), wherein the predetermined temperature when the block-side circulation is stopped (THL) is set to be different from the predetermined temperature when the block-side circulation is performed (THH).

The present invention may be more fully understood from the description of the preferred embodiments of the invention as set forth below, together with the accompanying drawings.

DESCRIPTION OF THE PREFERRED EMBODIMENTS

Figure 1:
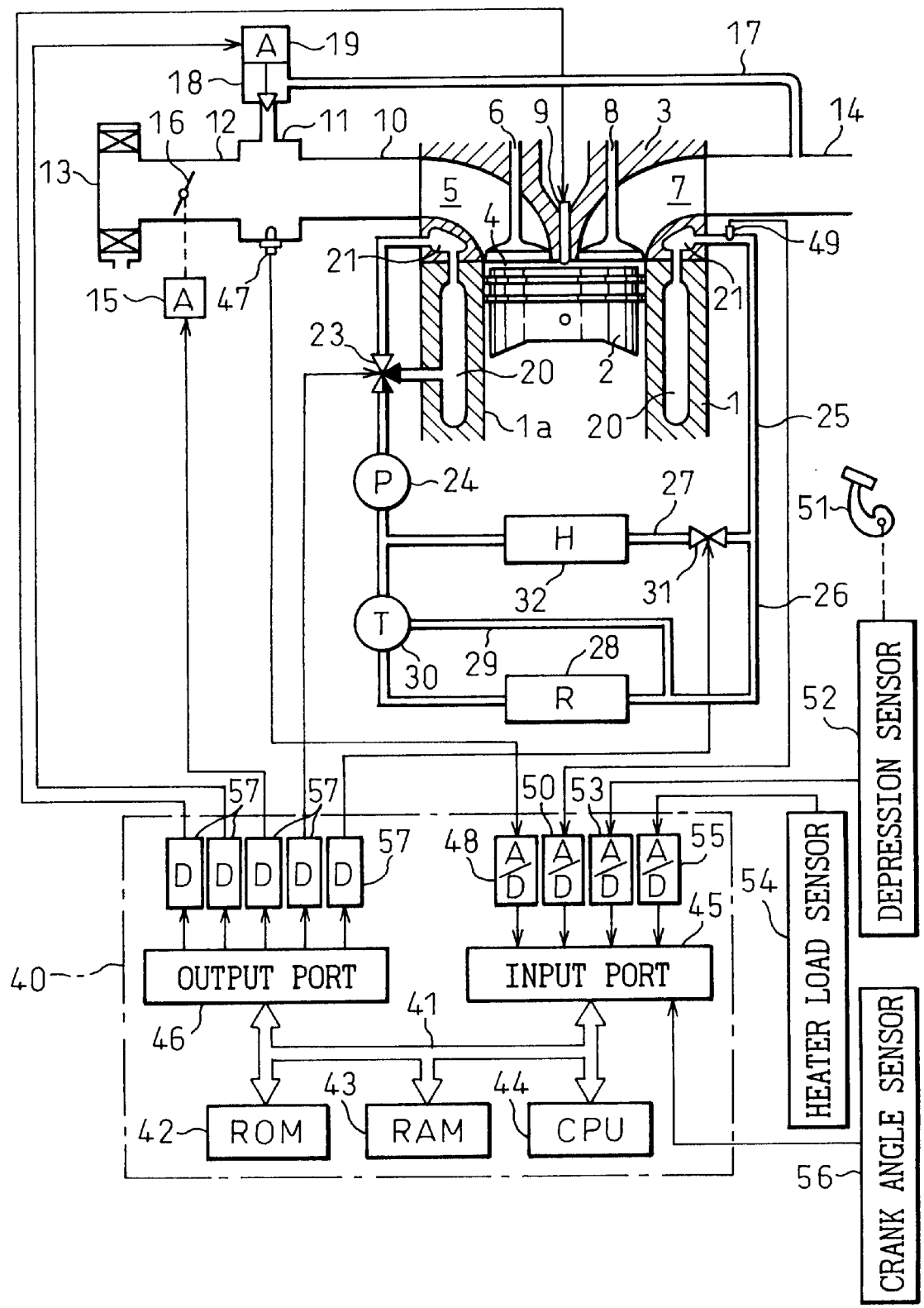
FIG. 1 is a general view of an engine.

FIG. 1 illustrates the present invention applied to a diesel engine. Alternatively, the present invention may be applied to a spark-ignition gasoline engine.

Referring to FIG. 1, a reference numeral 1 designates a cylinder block, 2 designates a piston, 3 designates a cylinder head, 4 designates a combustion chamber, 5 designates an intake port, 6 designates an intake valve, 7 designates an exhaust port, 8 designates an exhaust valve, and 9 designates a fuel injector for injecting fuel directly into the combustion chamber 4. The intake ports 5 of each cylinder are connected to a common surge tank 11 via corresponding branches 10, and the surge tank 11 is connected to an air cleaner 13 via an intake duct 12. On the other hand, the exhaust ports 7 of each cylinder are connected to a common exhaust manifold 14. Note that the fuel injectors 9 are controlled by output signals from an electronic control unit 40.

Further, a throttle valve 16 is arranged in the intake duct 12, driven by an actuator 15 of, for example, electromagnetic type. The throttle valve 16 is usually kept fully open, and is slightly closed when the engine load or the engine speed is very low. The actuator 15 is controlled by output signals from the electronic control unit 40.

As shown in FIG. 1, the correcting portion of the exhaust manifold 14 and the surge tank 11 are connected to each other, via an EGR passage 17. An EGR control valve 18 is arranged in the EGR passage 17 for controlling the amount of the EGR gas flowing through the EGR passage 17, and is driven by an actuator 19 of, for example, an electromagnetic type. The actuator 19 is controlled by output signals from the electronic control unit 40.

When the supply of the EGR gas is to be performed, the EGR control valve 18 is opened, and thereby the EGR gas is fed to the combustion chamber 4. Contrarily, when the supply of the EGR gas is to be stopped, the EGR control valve 18 is closed.

Figure 2A:
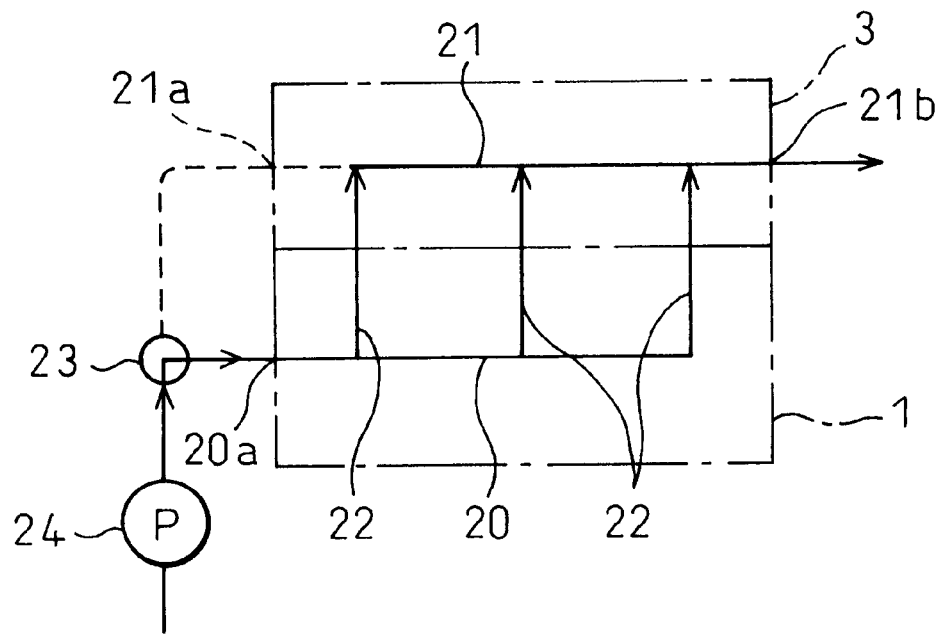
FIG. 2A schematically illustrates the flow of the cooling water when the cooling water circulation through the block-side and the head-side passages is performed.
Figure 2B:
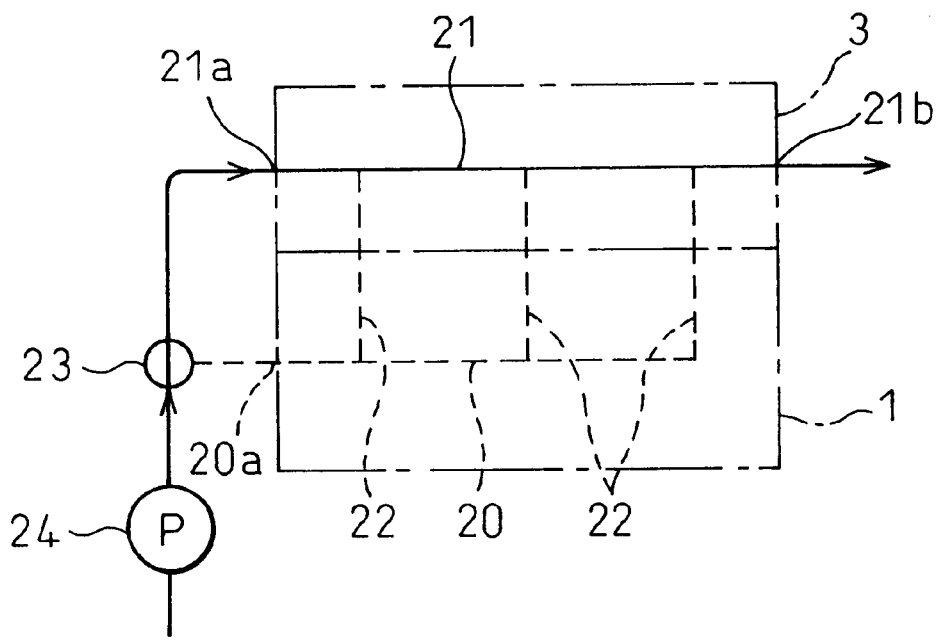
FIG. 2B schematically illustrates the flow of the cooling water when a cooling water circulation through a block-side passage is stopped while a cooling water circulation through a head-side passages is performed.

The engine shown in FIG. 1 is provided with a dual cooling system. Namely, a block-side cooling water passage 20 is formed in the cylinder block 1, and a head-side cooling water passage 21 is formed in the cylinder head 3, as shown in FIGS. 1, 2A and 2B. The head-side passage 21 extends from a cooling water inlet 21a thereof formed at one longitudinal end of the cylinder head 3 to a cooling water outlet 21b thereof formed at the other end, as shown in FIGS. 2A and 2B. The block-side passage 20 starts from a cooling water inlet 20a thereof formed at one longitudinal end of the cylinder block 1, which is in the same side with respect to the inlet 21a of the head-side passage 21, and extends around cylinder bore walls 1a (see FIG. 1), and then reaches the head-side passage 21 via communicating passages 22. The block-side and the head-side passages 20 and 21 substantially extend from one longitudinal end of the engine body to the other longitudinal end of the engine body.

The inlets of the block-side and the head-side passages 20a and 21a are connected to a common cooling water pump 24 driven by the engine, via a switching valve 23 of electromagnetic type. The switching valve 23 connects a discharge port of the pump 24 to one of the inlets of the block-side and the head-side passages 20a and 21a. The switching valve 23 is controlled by output signals from the electronic control unit 40.

When the switching valve 23 is controlled to connect the pump 24 to the inlet 20a of the block-side passage 20, the cooling water pumped out from the pump 24 flows through both of the block-side and the head-side passages 20 and 21, and then flows out from the outlet 21b, as shown in FIG. 2A by the solid line. Accordingly, both of the cooling water circulation through the block-side passage 20, which is referred to as the block-side circulation, hereinafter, and the cooling water circulation through the head-side passage 21, which is referred to as the head-side circulation, hereinafter, are performed.

Contrarily, when the switching valve 23 is controlled to connect the pump 24 to the inlet 21a of the head-side passage 21, the cooling water pumped out from the pump 24 flows through the head-side passage 21 without flowing through the block-side passage 20, and then flows out from the outlet 21b, as shown in FIG. 2B by the solid line. Accordingly, the head-side circulation is always performed, regardless of the performance of the block-side circulation. In other words, the head-side circulation is performed while the block-side circulation is stopped. In this way, the block-side circulation can be stopped without stopping the head-side circulation, in the engine shown in FIG. 1. Note that the block-side and the head-side passages 20 and 21 may be constructed in any form, as long as the block-side circulation being able to be stopped without stopping the head-side circulation.

Referring to FIG. 1 again, the outlet 21b of the head-side passage 21 is connected to a radiator passage 26 and a heater passage 27 in parallel via a cooling water outlet passage 25, and the radiator passage 26 and the heater passage 27 are connected to a suction port of the pump 24. A radiator 28 adapted to be exposed to the airflow over the vehicle is arranged in the radiator passage 26. Further, a bypass passage 29 is provided for connecting the upstream and the downstream of the radiator 28 to each other by bypassing the radiator 28. The radiator 28 and the bypass passage 29 are connected to the suction port of the pump 24, via a common thermostat valve 30.

As the temperature of the cooling water passing therethrough becomes lower, the thermostat valve 30 increases an amount of the cooling water flowing through the bypass passage 29 and decreases an amount of the cooling water flowing through the radiator passage 26, and thus reduces the heat radiation from the cooling water. In other words, as the temperature of the cooling water passing through the thermostat valve 30 becomes higher, the thermostat valve 30 decreases the cooling water amount through the bypass passage 29 and increases the cooling water amount through the radiator passage 26, and thus enhances the heat radiation from the cooling water.

A heater control valve 31 and a heater 32 are arranged in the heater passage 27. When the heater control valve 31 is closed, all of the cooling water flowing out from the outlet passage 25 flows into the radiator passage 26, and when the heater control valve 31 is opened, a part of the cooling water from the outlet passage 25 flows into the heater passage 27. The heater 32 is for heating the compartment of the vehicle. Namely, when the cooling water flows through the heater 32, the heat radiates from the heater 32 and is used for heating the compartment. The heater control valve 31 is controlled by output signals from the electronic control unit 40.

Referring further to FIG. 1, the electronic control unit (ECU) 40 is constructed as a digital computer and comprises a read-only memory (ROM) 42, a random-access memory (RAM) 43, the CPU (micro processor) 44, an input port 45, and an output port 46. ROM 42, RAM 43, CPU 44, the input port 45, and the output port 46 are interconnected with each other via a bidirectional bus 41. A pressure sensor 47 is arranged in the surge tank 11, and generates an output voltage in proportion to the pressure in the surge tank 11. The output voltage of the sensor 47 is input to the input port 45 via an AD converter 48. A temperature sensor 49 is arranged in the outlet passage 25 adjacent to the outlet 21a of the head-side passage 21, and generates an output voltage in proportion to the temperature THW of the cooling water flowing therethrough. The output voltage of the sensor 49 is input to the input port 45 via an AD converter 50. A depression sensor 52 is connected to an acceleration pedal 51, and generates an output voltage in proportion to a depression DEP of the acceleration pedal 51. The output voltage of the sensor 52 is input to the input port 45 via an AD converter 53. Further, a heater load sensor 54 generates an output voltage in proportion to the load of the heater 32, and the output voltage of the sensor 54 is input to the input port 45 via an AD converter 55. The heater load sensor 54 senses the heater load on the basis of, for example, the difference between the actual temperature in the compartment of the vehicle and the desired temperature thereof. The input port 45 is also connected to a crank angle sensor 56, which generates a pulse whenever a crankshaft is turned by, for example, 30 degrees. According to these pulses, the CPU 44 calculates the engine speed N. On the other hand, the output port 46 is connected to the fuel injectors 9, the actuators 15 and 19, the switching valve 23, and the heater control valve 31, via corresponding drive circuits 57.

As mentioned in the beginning, the supply of the EGR gas improves the exhaust emission. Thus, if the supply of the EGR gas is performed over the entire engine operation, the exhaust emission is improved over the entire engine operation. However, if the supply of the EGR gas is performed when the temperature of the cylinder bore wall 1a is low, sulfuric acid may be generated from the sulfur fraction in the EGR gas, and thereby the bore wall 1a or the piston ring may be corroded, as mentioned in the beginning. To solve this problem, in the engine shown in FIG. 1, the supply of the EGR gas is stopped when the temperature TW of the bore wall 1a is lower than a lower threshold temperature TWL, above which the corrosion of the bore wall 1a, etc. will not occur, such as about 60° C., and is performed when the bore wall temperature TW is higher than the lower threshold temperature TWL.

The cooling water temperature THW substantially represents the bore wall temperature TW. Thus, it may be thought that controlling the supply of the EGR gas on the basis of the cooling water temperature THW makes the supply of the EGR gas suitable without any additional sensor for directly sensing the bore wall temperature TW. However, for the identical cooling water temperature THW, it has found that there is a difference between the bore wall temperature TW with the block-side circulation being stopped and that with the block-side circulation being performed. In other words, for the identical bore wall temperature TW, there is a difference between the cooling water temperature THW with the block-side circulation being stopped, and that with the block-side circulation being performed. Thus, the supply of the EGR gas is not suitably controlled if the supply of the EGR gas is simply controlled on the basis of the cooling water temperature THW without considering the block-side circulation.

Figure 3:
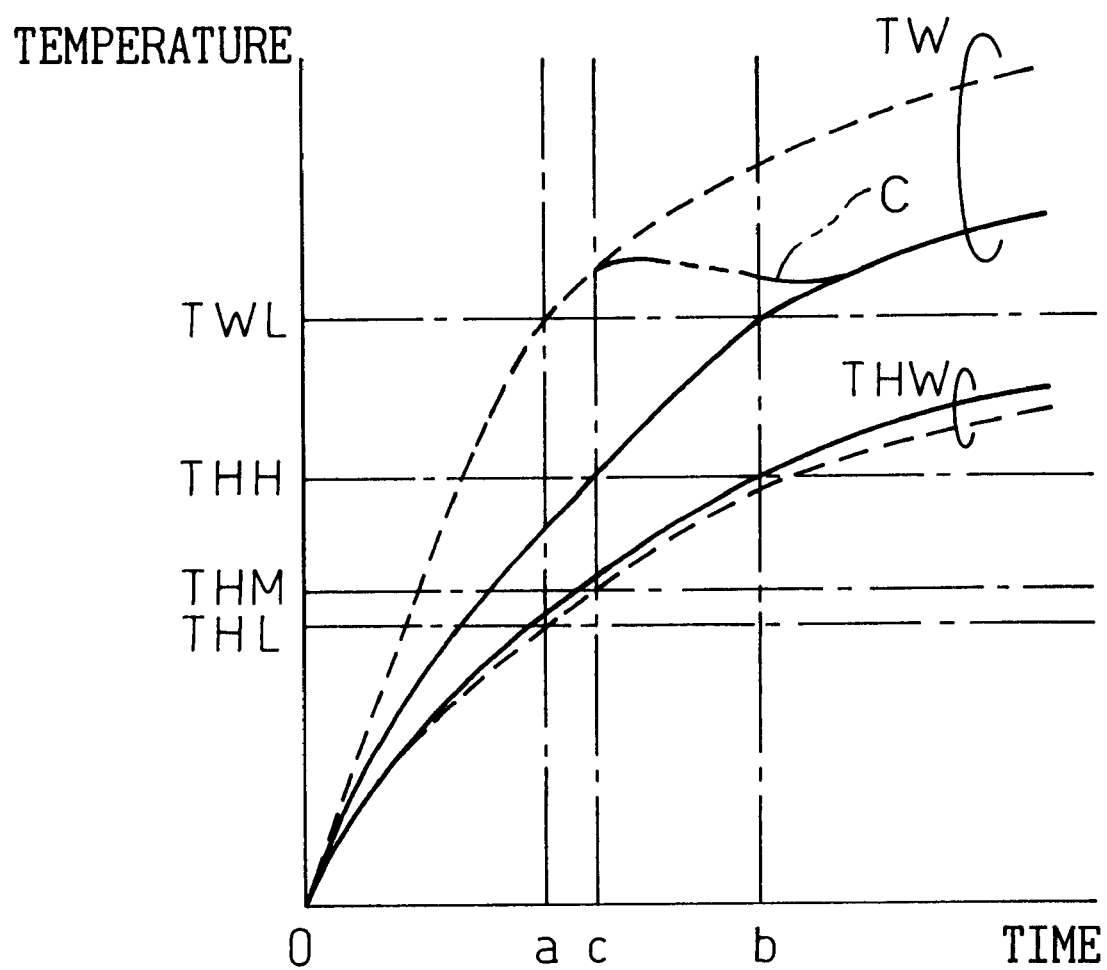
FIG. 3 shows a time chart illustrating variations in temperatures of a cylinder bore wall and a cooling water.

FIG. 3 illustrates experimental results showing the variation with time in the bore wall temperature TW and the cooling water temperature THW, from when the engine starts. In FIG. 3, the solid line shows a case where the block-side circulation is performed, and the broken line shows a case where the block-side circulation is stopped. Further, the time zero in FIG. 3 represents a time when the engine starts.

Referring to FIG. 3, in the case where the block-side circulation is performed, the bore wall temperature TW becomes higher than the lower threshold TWL when the cooling water temperature THW becomes higher than THH, as at the time b in FIG. 3. Thus, in the engine shown in FIG. 1, in the case where the block-side circulation is performed, the supply of the EGR gas is stopped when the cooling water temperature THW is lower than THH, and is performed when the cooling water temperature THW is higher than THH. This ensures the suitable control of the supply of the EGR gas in the case where the block-side circulation is performed.

Contrarily, in the case where the block-side circulation is stopped, the bore wall temperature TW becomes higher than the lower threshold TWL when the cooling water temperature THW becomes higher than THL, which is lower than THH, as at the time a in FIG. 3. In this case, if the supply of the EGR gas is stopped when the cooling water temperature THW is lower than THH, and is performed when the cooling water temperature THW is higher than THH, as in the case where the block-side circulation is performed, the supply of the EGR gas is not performed from the time a to b, even though the bore wall temperature TW is higher than the lower threshold TWL. As a result, the improvement of the exhaust gas by the EGR gas is not performed from the time a to b.

Further, if the idling operation of the engine is performed over the long time when the atmospheric temperature is very low, for example, the bore wall temperature TW may become lower than the lower threshold TWL, even after the warming-up completes. In this case, if the block-side circulation is stopped, the cooling water temperature THW becomes lower than THH, even though the bore wall temperature TW is higher than the lower threshold TWL. Thus, if the supply of the EGR gas is stopped when the cooling water temperature THW is lower than THH as mentioned above, the supply of the EGR gas and thus the improvement of the exhaust emission is not performed from when the cooling water temperature THW becomes lower than THH until the bore wall temperature TW becomes lower than the lower threshold TWL.

Thus, in the engine shown in FIG. 1, in the case where the block-side circulation is performed, the supply of the EGR gas is stopped when the cooling water temperature THW is lower than THL, which is different from THH, and is performed when the cooling water temperature THW is higher than THL. As a result, the supply of the EGR gas is suitably controlled in the case where the block-side circulation is performed. Thus, in the example shown in FIG. 3, the supply of the EGR gas is performed during the period from time a to b, and accordingly the supply of the EGR gas starts quickly after the engine starts. Further, the stoppage of the supply of the EGR gas is retarded when the bore wall temperature drops. As a result, the improvement of the exhaust emission by the EGR gas is ensured over a wider range of engine operating conditions.

Namely, in the engine shown in FIG. 1, the supply of the EGR gas is stopped when the cooling water temperature THW is lower than a predetermined temperature THE, and is performed when the cooling water temperature THW is lower than the predetermined temperature THE. Further, if THH and THL mentioned above are referred to as first and second predetermined temperatures, respectively, the predetermined temperature THE is set to the first predetermined temperature THH when the block-side circulation is performed, and is set to the second predetermined temperature THL, which is lower than the first predetermined temperature THH when the block-side circulation is stopped. Note that the predetermined temperatures THH and THL are obtained in advance by experiment, and are stored in the ROM 42 in advance.

Next, the control of the block-side circulation will be explained.

As mentioned above, it is preferable for the improvement of the exhaust emission that the bore wall temperature TW is kept higher than the lower threshold TWL. Thus, in the engine shown in FIG. 1, the block-side circulation is stopped basically. If the cooling water temperature THW becomes lower than the first predetermined temperature THH when the block-side circulation is performed, then the block-side circulation is stopped.

However, if the block-side circulation is performed when the cooling water temperature THW becomes lower than the second predetermined temperature THL under the block-side circulation being stopped, a problem may arise. Namely, if the block-side circulation starts, the cooling of the bore wall starts and the bore wall temperature TW becomes lower. Therefore, if the block-side circulation starts just when the cooling water temperature THW becomes higher than the second predetermined temperature THL, the bore wall temperature TW may temporarily drop lower than the lower threshold TWL. Thus, in the engine shown in FIG. 1, a circulation starting temperature THM, which is higher than the second predetermined temperature as shown in FIG. 3, is determined so that the bore wall temperature TW will not temporarily drop lower than the lower threshold TWL after the block-side circulation starts, and the block-side circulation starts when the cooling water temperature THW is higher than THM. Namely, when the cooling water temperature THW is higher than THM as at the time c in FIG. 3, the bore wall temperature TW changes as shown by the curve C in FIG. 3.

On the other hand, the cooling water temperature THW when the block-side circulation is performed is higher than that when the block-side circulation is stopped, as shown in FIG. 3. Thus, performing the block-side circulation enhances the output of the heater 32. Therefore, in the engine shown in FIG. 1, when the heater load HLD is higher than a predetermined load LD1, the block-side circulation is performed, regardless of the cooling water temperature THW, i.e., the bore wall temperature TW, to thereby ensure the good heating performance of the heater 32.

Figure 4:
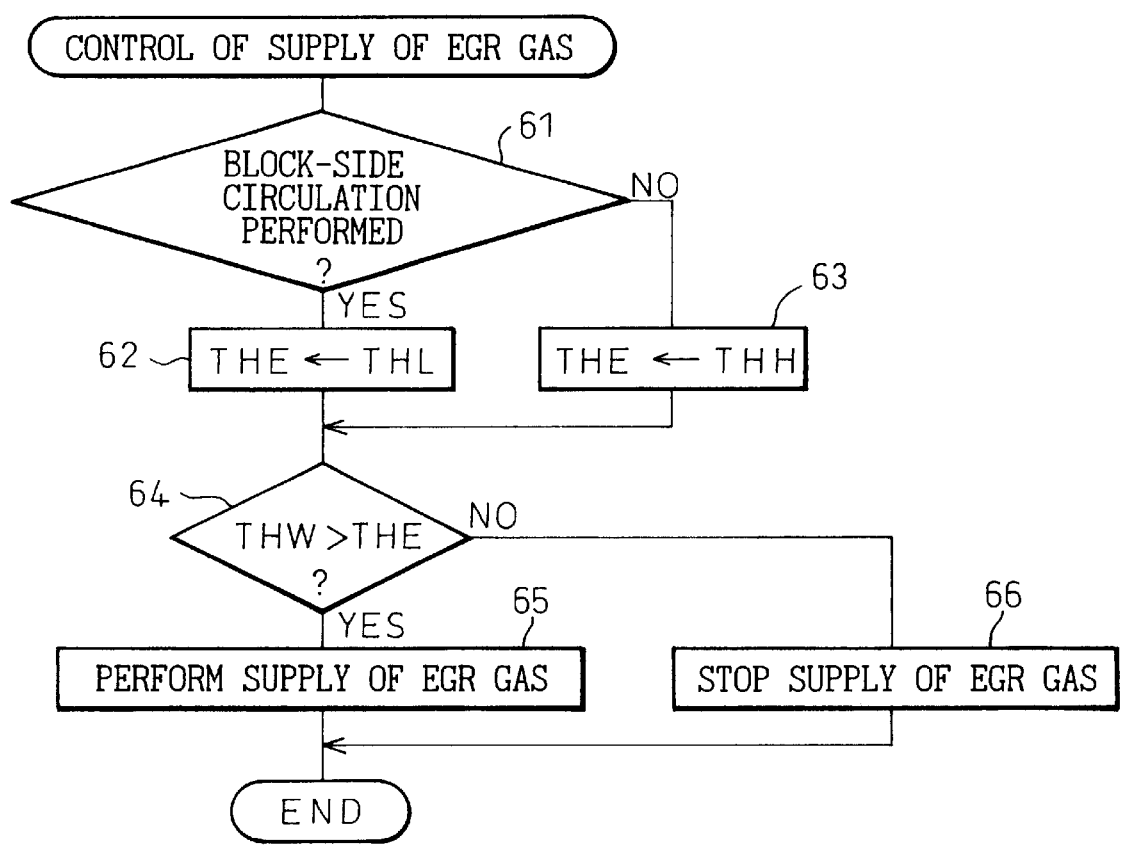
FIG. 4 shows a flowchart for controlling a supply of an EGR gas.

FIG. 4 illustrates a routine for executing a control of the supply of the EGR gas. This routine is executed by interruption every predetermined time.

Referring to FIG. 4, first, in step 61, it is judged whether the block-side circulation is performed. If the block-side circulation is performed, the routine goes to step 62, where the predetermined temperature THE is set to the second predetermined temperature THL. Then, the routine goes to step 64. Contrarily, if the block-side circulation is stopped, the routine goes to step 63, where the predetermined temperature THE is set to the first predetermined temperature THH. Then, the routine goes to step 64.

In step 64, it is judged whether the cooling water temperature THW is higher than the predetermined temperature THE. If THW>THE, the routine goes to step 65, where the supply of the EGR gas is performed. Namely, if THW>THE, it is judged that the bore wall temperature TW is higher than the lower threshold TWL, and thus the supply of the EGR gas is performed. Then, the processing cycle is ended. Contrarily, if THW≦THE in step 64, the routine goes to step 66, where the supply of the EGR gas is stopped. Namely, if THW≦THE, it is judged that the bore wall temperature TW is lower than the lower threshold TWL, and thus the supply of the EGR gas is stopped.

Note that, during the supply of the EGR gas, the amount of the EGR gas supplied to the engine is set to reduce the amount of $NO_x$ discharged from the engine as much as possible, for enlarging the output torque of the engine as much as possible, and for reducing the change in the torque as much as possible. The opening of the EGR control valve 18 to make the EGR gas amount equal to this suitable amount is obtained by experiments in advance, and is stored in the ROM 42 in advance, in the form of a map as a function of the depression DEP of the accelerator pedal 51 and the engine speed N.

Figure 5:
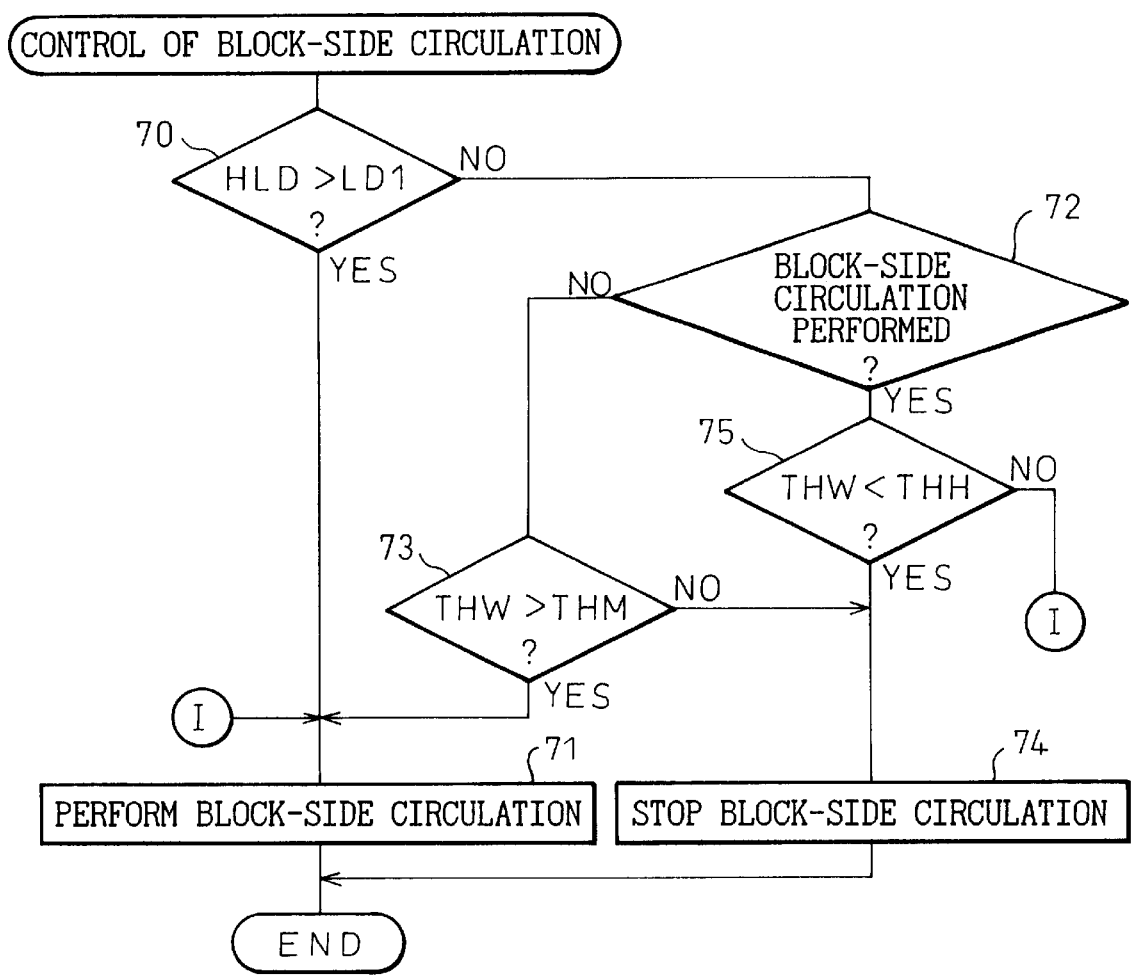
FIG. 5 shows a flowchart for controlling a cooling water circulation through a block-side passage.

FIG. 5 illustrates a routine for executing a control of the block-side circulation. This routine is executed by interruption every predetermined time.

Referring to FIG. 5, first, in step 70, it is judged whether the heater load HLD is higher than the predetermined load LD1. If HLD>LD1, the routine goes to step 71, where the switching valve 23 is controlled to perform the block-side circulation. Then, the processing cycle is ended. Contrarily, if HLD≦LD1, the routine goes to step 72.

In step 72, it is judged whether the block-side circulation is performed at this time. If the block-side circulation is stopped, the routine goes to step 73, where it is judged whether the cooling water temperature THW is higher than the circulation starting temperature THM. If THW>THM, the routine goes to step 71 and the block-side circulation is performed. Contrarily, if THW≦THM, the routine goes to step 74, where the block-side circulation is kept stopped.

Contrarily, if the block-side circulation is performed in step 72, the routine goes to step 75, where it is judged whether the cooling water temperature THW is lower than the first predetermined temperature THH. If THW<THH, the routine goes to step 74, where the switching valve 23 is controlled to stop the block-side circulation. Contrarily, if THW≧THH, the routine goes to step 71 and the block-side circulation continues.

According to the present invention, it is possible to provide an exhaust gas recirculation control device for an engine with a dual cooling system capable of suitably controlling the supply of the EGR gas regardless of the operation of the cooling water circulation, to thereby ensure the improvement of the exhaust emission by the EGR gas.

While the invention has been described by reference to specific embodiments chosen for purposes of illustration, it should be apparent that numerous modifications could be made thereto by those skilled in the art without departing from the basic concept and scope of the invention.

We claim:

1. An exhaust gas recirculation control device for an engine with a dual cooling system, the dual cooling system having a head-side cooling water passage formed in a cylinder head, through which a cooling water can be circulated, and a block-side cooling water passage formed in a cylinder block, through which a cooling water can be circulated, in which a block-side circulation can be stopped without stopping a head-side circulation, the device comprising:

a temperature sensor for detecting a temperature of the cooling water circulating the head-side passage (THW); and an exhaust gas recirculation system for supplying an EGR gas to the engine, the exhaust gas recirculation system performing the supply of the EGR gas when the cooling water temperature (THW) is higher than a predetermined temperature (THE), and stopping the supply of the EGR gas when the cooling water temperature (THW) is lower than the predetermined temperature (THE), wherein the predetermined temperature when the block-side circulation is stopped (THL) is set to be different from the predetermined temperature when the block-side circulation is performed (THH).

2. An exhaust gas recirculation control device according to claim 1, wherein the predetermined temperature when the block-side circulation is stopped (THL) is set to be lower than the predetermined temperature when the block-side circulation is performed (THH).

3. An exhaust gas recirculation control device according to claim 1, wherein the dual cooling system controls the block-side circulation to keep a temperature of a cylinder bore wall (TW) higher than a threshold temperature (TWL).

4. An exhaust gas recirculation control device according to claim 3, wherein the threshold temperature (TWL) is about 60° C.

5. An exhaust gas recirculation control device according to claim 3, wherein, in the case where the block-side circulation is performed, the block-side circulation is stopped when the cooling water temperature (THW) becomes lower than a circulation stopping temperature.

6. An exhaust gas recirculation control device according to claim 5, wherein the circulation stopping temperature is set to be equal to the predetermined temperature when the block-side circulation is performed (THH).

7. An exhaust gas recirculation control device according to claim 3, wherein, in the case where the block-side circulation is stopped, the block-side circulation is performed when the cooling water temperature (THW) becomes higher than a circulation starting temperature (THM).

8. An exhaust gas recirculation control device according to claim 7, wherein the circulation starting temperature (THM) is set to be higher than the predetermined temperature when the block-side circulation is stopped (THL).

9. An exhaust gas recirculation control device according to claim 1, wherein cooling water inlets of the head-side and the block-side passages are connected to a discharge port of a cooling water pump via a switching valve, the switching valve connecting the discharge port of the pump with one of the inlets of the head-side and the block-side passages, wherein a cooling water outlet of the head-side passage is connected to a suction port of the pump via a cooling water passage, and wherein a cooling water outlet of the block-side passage is connected to the head-side passage, whereby, when the switching valve connects the discharge port of the pump to the inlet of the block-side passage, the cooling water circulates through the block-side passage, the head-side passage, and the cooling water passage, to thereby perform both of the head-side and the block-side circulation, and when the switching valve connects the discharge port of the pump to the inlet of the head-side passage, the cooling water circulates through the head-side passage and the cooling water passage, to thereby perform the head-side circulation and stop the block-side circulation.

10. An exhaust gas recirculation control device according to claim 9, wherein the engine is provided with a heater arranged in the cooling water passage for heating a compartment of a vehicle using heat of the cooling water, and detecting means for detecting a heater load, and wherein the block-side circulation is performed when the heater load is higher than a predetermined load, regardless of the cooling water temperature.

* * * * *